(12) United States Patent
Sugimura

(10) Patent No.: US 8,651,080 B2
(45) Date of Patent: Feb. 18, 2014

(54) INTERNAL COMBUSTION ENGINE AND METHOD FOR ASSEMBLING INTERNAL COMBUSTION ENGINE

(75) Inventor: Kazuaki Sugimura, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/504,516

(22) PCT Filed: Nov. 29, 2010

(86) PCT No.: PCT/JP2010/071282
§ 371 (c)(1),
(2), (4) Date: Apr. 27, 2012

(87) PCT Pub. No.: WO2012/073309
PCT Pub. Date: Jun. 7, 2012

(65) Prior Publication Data
US 2013/0228410 A1    Sep. 5, 2013

(51) Int. Cl.
*F02N 15/02* (2006.01)
*F16D 11/00* (2006.01)

(52) U.S. Cl.
USPC ................................. 123/179.25; 192/45.1

(58) Field of Classification Search
USPC .............. 123/179.25, 179.26; 29/888.01; 192/41 R, 45.1
See application file for complete search history.

(56) References Cited

U.S. PATENT DOCUMENTS

| | | | |
|---|---|---|---|
| 5,842,548 A * | 12/1998 | Sato et al. | 192/45.1 |
| 7,559,303 B2 * | 7/2009 | Sakai et al. | 123/179.25 |
| 8,240,286 B2 * | 8/2012 | Li et al. | 123/179.25 |
| 8,522,631 B2 * | 9/2013 | Suzuki et al. | 74/7 C |
| 2008/0163842 A1 * | 7/2008 | Forssell et al. | 123/179.25 |
| 2008/0163843 A1 * | 7/2008 | Sakai et al. | 123/179.25 |
| 2008/0223156 A1 * | 9/2008 | Suzuki et al. | 74/9 |
| 2010/0288592 A1 * | 11/2010 | Papania et al. | 192/45.1 |
| 2011/0048358 A1 * | 3/2011 | Gaborel et al. | 123/179.25 |
| 2011/0168118 A1 * | 7/2011 | Li et al. | 123/179.25 |
| 2011/0168119 A1 * | 7/2011 | Steele et al. | 123/179.25 |
| 2013/0218432 A1 * | 8/2013 | Kudo et al. | 701/67 |

FOREIGN PATENT DOCUMENTS

| | | |
|---|---|---|
| JP | B2-3156516 | 4/2001 |
| JP | A-2002-155841 | 5/2002 |
| JP | A-2007-032498 | 2/2007 |
| JP | B2-4238855 | 3/2009 |
| JP | A-2010-175010 | 8/2010 |
| WO | WO 2012/073309 A1 | 6/2012 |

OTHER PUBLICATIONS

Feb. 15, 2011 Translation of International Search Report issued in International Patent Application No. PCT/JP2010/071282.

* cited by examiner

*Primary Examiner* — Stephen K Cronin
*Assistant Examiner* — Arnold Castro
(74) *Attorney, Agent, or Firm* — Oliff PLC

(57) ABSTRACT

An internal combustion engine has a one-way clutch including a ring gear connected to the output shaft of a starting motor, an outer race member connected to a crankshaft, and a claw piece arranged between the outer circumferential surface of the ring gear and the inner circumferential surface of the outer race member facing the outer circumferential surface of the ring gear. The ring gear and the outer race member have a threaded hole and a through hole, respectively, to receive a jig for fixing the ring gear and the outer race member to each other.

9 Claims, 5 Drawing Sheets

INTERNAL COMBUSTION ENGINE AND METHOD FOR ASSEMBLING INTERNAL COMBUSTION ENGINE

FIELD OF THE INVENTION

The present invention relates to an internal combustion engine having a one-way clutch including an inner race member connected to the output shaft of an engine starting motor, an outer race member connected to the output shaft of the engine, and an engagement member arranged between the inner race member and the outer race member, and to a method for assembling the internal combustion engine.

BACKGROUND OF THE INVENTION

An internal combustion engine described in Patent Document 1, for example, includes a ratchet type one-way clutch, which is arranged between the output shaft of an engine starting motor (hereinafter, a starting motor) and a crankshaft. The clutch has a pocket portion formed in the inner circumferential surface of an outer race member, which is connected to the crankshaft. A claw piece is supported by a corner portion of the pocket portion in a radially inclinable manner. An engagement portion, with which the claw piece is engaged, is formed in an inner race member connected to the output shaft of the starting motor. A spring constantly urges the claw piece radially inward, or, in other words, in a direction in which the claw piece becomes engaged with the engagement portion. When the engine speed exceeds a rotational crank speed of the starting motor, or when engine starting is completed, the clutch suspends torque transmission from a ring gear to the crankshaft and from the crankshaft to the ring gear.

PRIOR ART DOCUMENT

Patent Document

Patent Document 1: Japanese Laid-Open Patent Publication No. 2002-155841

SUMMARY OF THE INVENTION

Assembling of an internal combustion engine having a one-way clutch may have the disadvantage described below. Specifically, the one-way clutch is installed in an engine body or on an engine output shaft in a state including an inner race member, an outer race member, and a claw piece mounted integrally in the clutch. In this state, the claw piece is simply held between the inner circumferential surface of the outer race member and the opposing outer circumferential surface of the inner race member. Accordingly, if the inner race member and the outer race member become spaced from each other when the one-way clutch is mounted, the claw member falls off the clutch. This makes mounting of the one-way clutch difficult, thus making it necessary to carefully perform the step of mounting the clutch.

The above-described problem is particularly common in an internal combustion engine having a ratchet type one-way clutch. However, the problem also occurs to varied extents in internal combustion engines having other types of one-way clutches.

Accordingly, it is an objective of the present invention to provide an internal combustion engine and a method for assembling the engine that facilitate mounting of a one-way clutch to an engine body and an engine output shaft by preventing an engagement member from falling off an inner race member and an outer race member.

To achieve the foregoing objective, an internal combustion engine according to the present invention includes a one-way clutch including an inner race member connected to an output shaft of a motor for starting the engine, an outer race member connected to an engine output shaft, and an engagement member arranged between an outer circumferential surface of the inner race member and an inner circumferential surface of the outer race member facing the outer circumferential surface of the inner race member. The inner race member and the outer race member both include an attachment portion for attaching a fixing member for fixing the inner race member and the outer race member to each other.

In this configuration, after the inner race member, the outer race member, and the engagement member configuring the one-way clutch are assembled integrally, the fixing member is attached to the attachment portions located in the inner race member and the outer race member, thus fixing the inner and outer race members to each other. This prevents the inner race member and the outer race member from separating from each other when the one-way clutch is mounted with respect to the engine body and the engine output shaft. The engagement member is also prevented from falling off the inner race member and the outer race member. As a result, mounting of the one-way clutch to the engine body and the engine output shaft is facilitated.

In this case, it is preferable that the one-way clutch be a ratchet type one-way clutch, that the engagement member be a claw piece, and that an engagement portion with which the claw piece is engageable be formed in the outer circumferential surface of the inner race member.

In an internal combustion engine having a ratchet type one-way clutch, a claw piece is simply held between the outer circumferential surface of an inner race member and the inner circumferential surface of an outer race member facing the outer circumferential surface of the inner race member. As a result, if the inner race member and the outer race member become spaced from each other when the one-way clutch is mounted with respect to an engine body and an engine output shaft, the claw piece may fall off the inner and outer race members.

However, by employing the present invention in the internal combustion engine having the ratchet type one-way clutch, the claw piece is prevented from falling off the inner race member and the outer race member. The one-way clutch is thus easily installable with respect to the engine body and the engine output shaft.

Also, the attachment portions are preferably holes formed in the respective ones of the inner race member and the outer race member, and the fixing member is preferably passed through the holes.

In this aspect, the inner race member and the outer race member are fixed to each other through a simple configuration in which the jig is passed through the holes formed in the inner race member and the outer race member.

In this case, it is preferably that the inner race member be arranged between the outer race member and a cylinder block in the axial direction of the engine output shaft, the outer race member have a through hole extending along the axis of the engine output shaft, the inner race member have a threaded hole extending along the axis of the engine output shaft, and the through hole and the threaded hole be radially spaced from the axis of the engine output shaft by equal distances.

In this aspect, the inner race member and the outer race member are fixed to each other using the fixing member, which has a threaded shape, and then, in this state, mounted with respect to the engine body and the engine output shaft. Afterwards, the fixing member is easily detached from the side corresponding to the through hole formed in the outer race member. This further facilitates mounting of the one-way clutch with respect to the engine body and the engine output shaft.

In this case, it is preferable that a flywheel be connected to the engine output shaft on a side opposite to the inner race member with respect to the outer race member, and that the flywheel have a through hole that extends along the axis of the engine output shaft and be radially spaced from the axis by a distance equal to the distance by which the through hole and the threaded hole are radially spaced from the axis.

In this aspect, when the flywheel is mounted on the engine output shaft after the one-way clutch is installed with respect to the engine body and the engine output shaft, the basal portion of the fixing member, which is attached to the one-way clutch, is passed through the through hole formed in the flywheel, thus positioning the flywheel. The fixing member is easily removed after the flywheel is mounted on the engine output shaft. In a configuration in which the outer race member and the flywheel are fixed to the engine output shaft using a common bolt, the through hole of the outer race member and the through hole of the flywheel must be formed in the manner described below. Specifically, bolt holes for receiving the bolt are formed in the respective ones of the outer race member and the flywheel and arranged at corresponding positions in a circumferential direction of the outer race member (the flywheel). In this state, the through hole of the outer race member and the through hole of the flywheel must be located at corresponding positions in the circumferential direction of the outer race member (the flywheel).

To achieve the foregoing objective, provided is a method for assembling an internal combustion engine having a one-way clutch including an inner race member connected to an output shaft of a motor for starting the engine, an outer race member connected to an engine output shaft, and an engagement member arranged between an outer circumferential surface of the inner race member and an inner circumferential surface of the outer race member facing the outer circumferential surface of the inner race member. The method includes: a first step for mounting the inner race member and the outer race member on the engine output shaft in a state in which the inner and outer race members are fixed to each other by means of a fixing member with the engagement member installed; and a second step for separating the fixing member from the inner race member and the outer race member after the first step.

According to this method, after the inner race member and the outer race member are fixed to each other by means of the fixing member with the engagement member mounted in the inner and outer race members, the inner race member and the outer race member are mounted on the engine output shaft in the first step. Subsequently, in the second step, the fixing member is detached from the inner race member and the outer race member. This prevents separation between the inner race member and the outer race member when the one-way clutch is installed in the body of the internal combustion engine. As a result, the engagement member is prevented from falling off the inner race member and the outer race member. The one-way clutch is thus easily mounted with respect to the engine body and the engine output shaft.

In this case, it is preferable that the one-way clutch be a ratchet type one-way clutch, that the engagement member be a claw piece, and that an engagement portion with which the claw piece is engageable be formed in the outer circumferential surface of the inner race member.

In an internal combustion engine having a ratchet type one-way clutch, a claw piece is simply held between the inner circumferential surface of an outer race member and the opposing outer circumferential surface of an inner race member. As a result, if the inner race member and the outer race member separate from each other when the one-way clutch is installed with respect to an engine body and an engine output shaft, the claw piece is likely to fall off the inner and outer race members.

However, by employing the present invention in a method for assembling the internal combustion engine having the ratchet type one-way clutch, the claw piece is prevented from falling off the inner race member and the outer race member. As a result, the one-way clutch is easily mounted with respect to the engine body and the engine output shaft.

It is preferable that the inner race member and the outer race member be mounted on the engine output shaft such that the inner race member is arranged between the outer race member and a cylinder block in the axial direction of the engine output shaft, that the outer race member have a through hole extending along the axis of the engine output shaft, that the inner race member have a threaded hole extending along the axis of the engine output shaft, that the through hole and the threaded hole be radially spaced from the axis of the engine output shaft by equal distances, and that the fixing member be a jig having an external threaded portion, wherein the inner race member and the outer race member are fixed to each other by passing the jig through the through hole and threading the threaded portion onto the threaded hole.

According to this method, after the inner race member and the outer race member are fixed to each other using the jig having the threaded portion and then mounted with respect to the engine body and the engine output shaft, the jig is easily detached from the side corresponding to the through hole formed in the outer race member. This further facilitates installation of the one-way clutch with respect to the engine body and the engine output shaft.

In this case, it is preferable that a flywheel be connected to the engine output shaft on a side opposite to the inner race member with respect to the outer race member, that the flywheel have a through hole that extends along the axis of the engine output shaft and is radially spaced from the axis by a distance equal to the distance by which the through hole and the threaded hole are radially spaced from the axis. The method preferably includes a third step for mounting the flywheel on the engine output shaft from the side opposite to the inner race member with respect to the outer race member to pass a basal portion of the jig through the through hole of the flywheel. The third step is performed after the first step and before the second step.

According to this method, when the flywheel is mounted on the engine output shaft after the one-way clutch is installed with respect to the engine body and the engine output shaft, the basal portion of the jig, which is attached to the one-way clutch, is passed through the through hole of the flywheel to position the flywheel. After the flywheel is mounted on the engine output shaft, the jig is easily removed. In a method in which the outer race member and the flywheel are fixed to the engine output shaft using a common bolt, the through hole of the outer race member and the through hole of the flywheel must be arranged in the manner described below. Specifically, bolt holes for receiving the bolt are formed in the respective ones of the outer race member and the flywheel and arranged at corresponding positions in a circumferential direction of the outer race member (the flywheel). In this state, the through hole of the outer race member and the through hole of the flywheel must be located at corresponding positions in the circumferential direction of the outer race member (the flywheel).

DETAILED DESCRIPTION OF THE PREFERRED EMBODIMENTS

An embodiment of an internal combustion engine and a method for assembling the internal combustion engine according to the present invention will now be described with reference to FIGS. 1 to 5. In the present embodiment, an in-line four-cylinder type gasoline engine is employed as an internal combustion engine 1.

Figure 1:
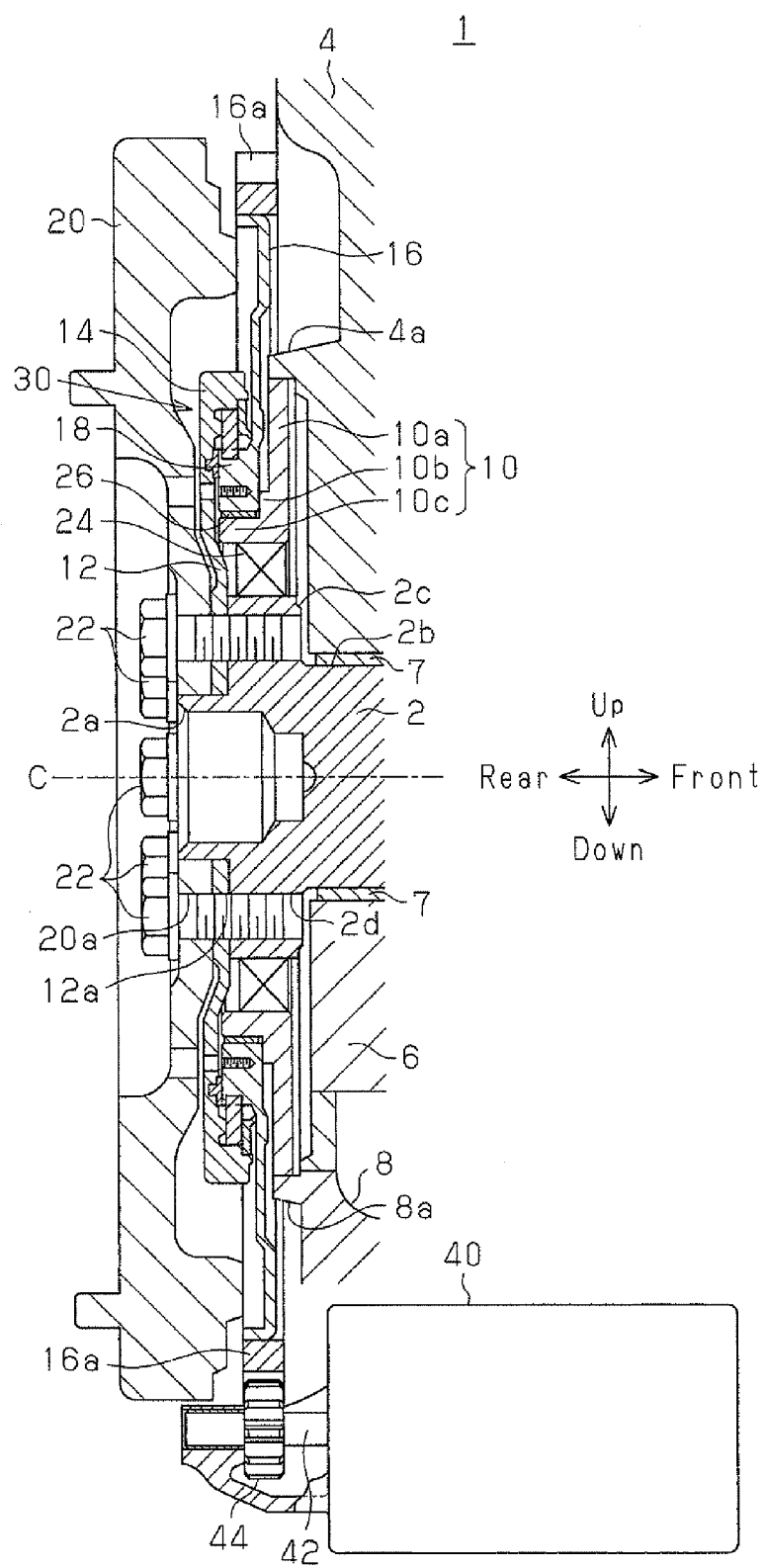
FIG. 1 is a cross-sectional view showing a portion of an internal combustion engine according to one embodiment of the present invention in the vicinity of a one-way clutch.

FIG. 1 shows a cross section of a portion of the engine 1 according to the present embodiment in the vicinity of a one-way clutch.

In the description below, the front side (the right side as viewed in FIG. 1) of the engine 1 will be referred to simply as "the front side". The rear side (the left side as viewed in the drawing) of the engine 1 will be referred to simply as "the rear side". A vertical upper side (an upper side as viewed in FIG. 1) and a vertical lower side (a lower side as viewed in the drawing) will be referred to simply as "an upper side" and "a lower side", respectively. A side close to the axis C of a crankshaft 2 and a side spaced from the axis C will be referred to simply as "an inner side" and "an outer side", respectively. The direction extending in the axis C of the crankshaft 2 will be referred to simply as the axial direction.

As illustrated in FIG. 1, a journal bearing portion configured by a cylinder block 4 and a crank bearing 6 is arranged in a rear portion of the engine 1. The journal bearing portion supports a journal 2b of the crankshaft 2. As a result, a rear end portion 2a of the crankshaft 2 projects rearward from a rear portion of the cylinder block 4.

A fitting portion 4a, which projects rearward, is formed at the rear end of the cylinder block 4. An oil pan 8 for retaining oil is arranged below a crank bearing 6 and has a fitting portion 8a, which projects rearward from the rear end of the oil pan 8. A substantially cylindrical retainer 10 is fitted to the inner peripheries of the fitting portions 4a, 8a.

The outer diameter of the retainer 10 decreases in three steps axially from the front side toward the rear side. The inner diameter of the retainer 10 is uniform in the axial direction. The portions corresponding to the decreasing outer diameter will be referred to as a large diameter portion 10a, a middle diameter portion 10b, and a small diameter portion 10c sequentially in this order from the front side. The large diameter portion 10a of the retainer 10 is fitted to the fitting portions 4a, 8a.

The crankshaft 2 has a large diameter portion 2c, which is located forward of the rear end portion 2a and projects outward. An oil seal 24 is mounted between the outer circumferential surface of the large diameter portion 2c and the inner circumferential surface of the retainer 10 to prevent oil leak from the interior of the engine 1.

A cylindrical first bushing 26 is arranged around the outer circumferential surface of the small diameter portion 10c of the retainer 10. A ring gear 16, which has a substantially disk-like shape and a hole formed in a central portion of the ring gear 16, is arranged around the first bushing 26 and rotatably supported by the outer circumferential surface of the first bushing 26. The ring gear 16 has a substantially cylindrical inner race 18, which is formed along an inner radial end portion of the ring gear 16 and extends axially rearward. A gear portion 16a is formed at the outer circumferential end portion of the ring gear 16.

A pinion gear 44, which is located on an output shaft 42 of a starting motor 40, is constantly meshed with the gear portion 16a. The starting motor 40 receives electric power from a non-illustrated battery mounted in the vehicle.

A substantially disk-like outer race member 12 having a hole formed in a central portion of the outer race member 12 is fixed to the rear end portion 2a of the crankshaft 2 and located rearward of the large diameter portion 2c. The inner circumferential surface of the outer race member 12 contacts the rear end portion 2a of the crankshaft 2. The front end surface of the outer race member 12 contacts the rear end surface of the large diameter portion 2c. A substantially cylindrical outer race 14 having an outer end portion extending forward is formed in the outer race member 12. The inner circumferential surface of the outer race 14 radially faces the outer circumferential surface of the inner race 18.

The outer race 14 and the inner race 18 configure a ratchet type one-way clutch 30, which permits torque transmission from the starting motor 40 to the crankshaft 2 and prohibits torque transmission from the crankshaft 2 to the starting motor 40.

A substantially disk-like flywheel 20 having a hole in a central portion is fixed to the rear end portion 2a of the crankshaft 2 and located rearward of the outer race 14.

A plurality of axial bolt holes 2d are formed and arranged circumferentially in the large diameter portion 2c of the crankshaft 2. A plurality of axial through holes 12a and a plurality of through holes 20a corresponding to the bolt holes 2d are formed in the outer race member 12 and the flywheel 20, respectively. Bolts 22 are passed through the bolt holes 2d and the corresponding through holes 12a, 20a to join the crankshaft 2, the outer race member 12, and the flywheel 20 integrally with one another.

Hereinafter, with reference to FIGS. 2 and 3, the configuration in the vicinity of the one-way clutch 30 will be described.

Figure 2:
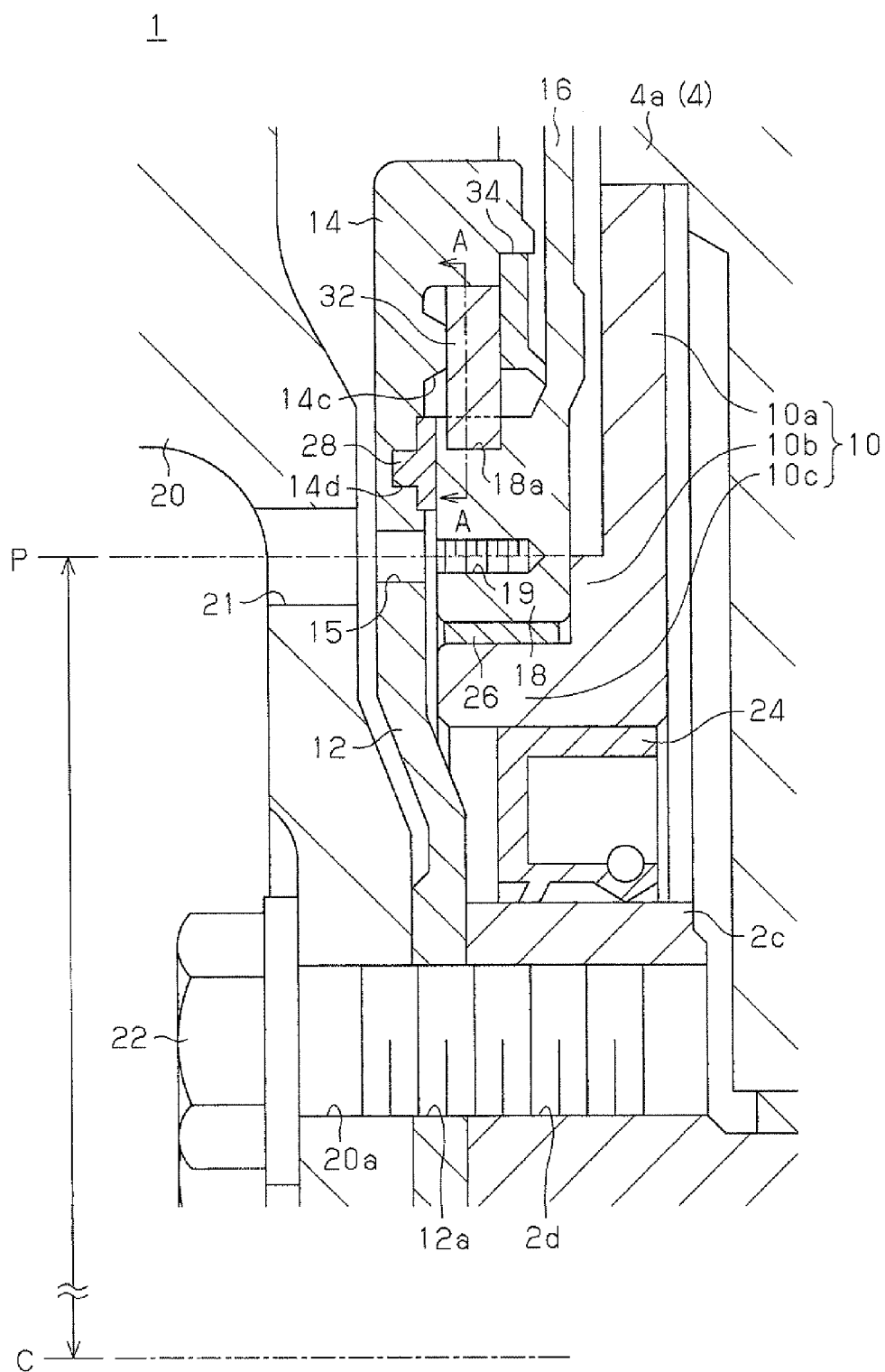
FIG. 2 is an enlarged cross-sectional view showing a portion of the embodiment in the vicinity of the one-way clutch.
Figure 3A:
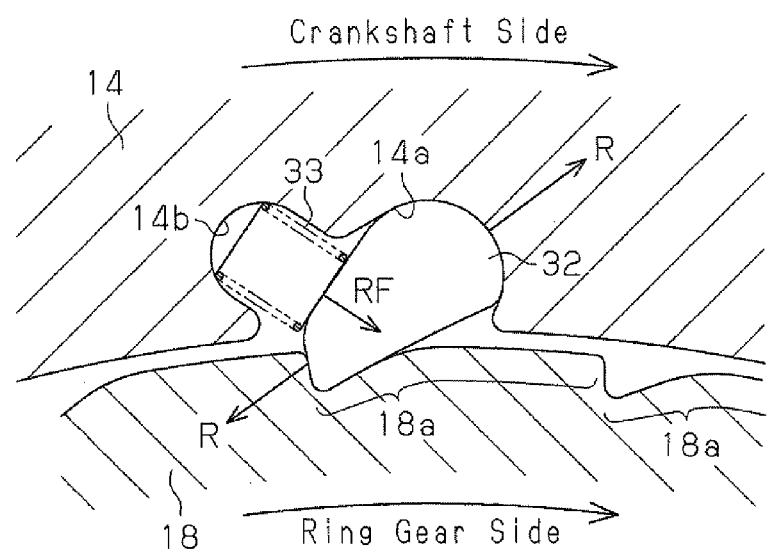
FIG. 3(a) is a schematic cross-sectional view taken along line A-A of FIG. 2, illustrating a state in which the engine is starting.
Figure 3B:
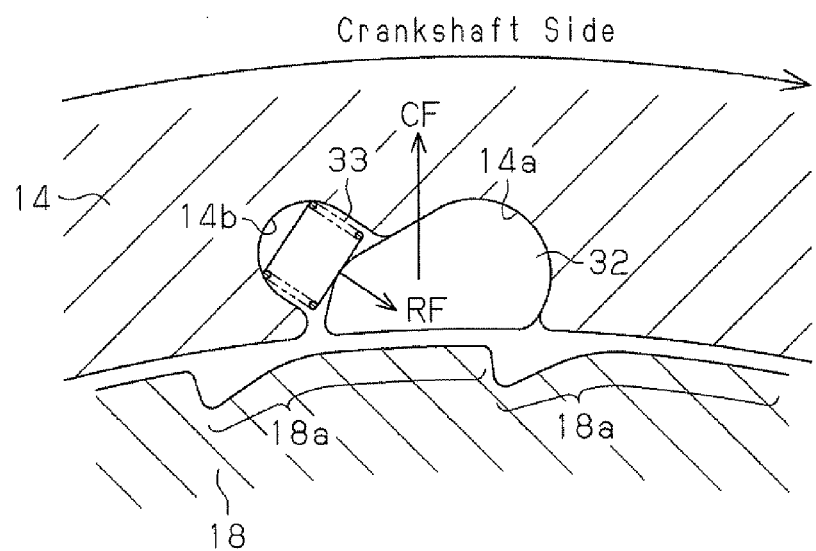
FIG. 3(b) is a schematic cross-sectional view taken along line A-A of FIG. 2, illustrating a state after the engine is started.

As illustrated in FIGS. 2, 3(a), and 3(b), the one-way clutch 30 has claw pieces 32 and engagement portions 18a. The claw pieces 32 rotate together with the crankshaft 2. The engagement portions 18a rotate together with an output shaft 42 of the starting motor 40. The claw pieces 32 are engaged with the corresponding engagement portions 18a.

Specifically, the claw pieces 32 and springs 33, which urge the corresponding claw pieces 32 to pivot inward in radial directions of the outer race 14 and the inner race 18, are arranged between the outer race 14 and the inner race 18 and spaced apart circumferentially at predetermined angular intervals.

Recesses 14a for receiving the claw pieces 32 and spring accommodating portions 14b for accommodating the springs 33 are formed in the inner circumferential surface of the outer race 14 in correspondence with the claw pieces 32 and the springs 33.

Each of the recesses 14a has a round support portion, which is located forward in a clockwise direction. An end of the corresponding one of the claw pieces 32 contacts the support portion. Each claw piece 32 is allowed to pivot about the support portion, which is the support point, in radial directions of the outer race 14 and the inner race 18.

The engagement portions 18a are formed in the outer circumferential surface of the inner race 18 continuously from one engagement portion 18a to another to cover the range corresponding to the entire circumference of the inner race 18.

Each of the engagement portions 18a has an outer diameter that gradually increases from a first predetermined value to a second predetermined value in a clockwise direction. After reaching the second predetermined value, the outer diameter is decreased to the first predetermined value. This forms a step to be engaged by a corresponding one of the claw pieces 32 at the position where the outer diameter of the engagement portion 18a decreases from the second predetermined value to the first predetermined value.

Grease serving as lubricant is applied to the gap between the inner circumferential surface of the outer race 14 and the outer circumferential surface of the inner race 18. A grease seal 34 prevents the grease from leaking from the gap.

The components and portions configuring the one-way clutch 30 are classified generally into a group of components and portions that rotate together with the output shaft 42 of the starting motor 40 (hereinafter, a first group) and a group of components and portions that rotate together with the crankshaft 2 (hereinafter, a second group). The first group includes the ring gear 16, the inner race 18, and the engagement portions 18a. The second group includes the claw pieces 32, the outer race 14, and the outer race member 12.

As a result, torque produced by the output shaft of the starting motor 40 is transmitted to the ring gear 16, the inner race 18, and the engagement portions 18a sequentially in that order. When the claw pieces 32 are engaged with the corresponding engagement portions 18a, the torque transmitted to the engagement portions 18a, as has been described, is transmitted to the engaged claw pieces 32, the outer race 14, and the outer race member 12 sequentially in this order. The torque is eventually transmitted to the crankshaft 2.

A projection 14c, which projects forward to support the claw pieces 32, is formed on a portion of the front end surface of the outer race member 12, which faces the claw pieces 32. A groove 14d is formed in a portion of the front end surface of the outer race member 12 facing the inner race 18. A second bushing 28, which supports the inner race 18 in the axial direction, is received in the groove 14d. In other words, the inner race 18 is supported by both the front end surface of the second bushing 28 and the rear end surface of the middle diameter portion 10b of the retainer 10 in the axial direction.

The inner race 18 is supported by the outer circumferential surface of the first bushing 26 in a radial direction.

In the present embodiment, properties including the mass of each claw piece 32 and the urging force of each spring 33 are set such that the urging force of the spring 33 exceeds the centrifugal force acting on the claw piece 32 when the engine speed NE is greater than or equal to an engine-starting determination speed NC (approximately 400 rpm) and lower than a predetermined engine speed Nth (NC≤NE<Nth). The predetermined engine speed Nth is lower than an idling engine speed NI (approximately 800 rpm) (NC≤Nth<NI).

In the one-way clutch 30 configured as described above, when the rotational speed of the ring gear 16, which is the rotational speed of each engagement portion 18a, is greater than the rotational speed of the crankshaft 2 (hereinafter, the engine speed NE), as in the time of engine starting, each claw piece 32 is urged radially inward by the urging force RE of the associated spring 33 and engaged with the corresponding engagement portion 18a, as illustrated in FIG. 3(a). This joins the inner race 18 with the outer race 14 through the claw pieces 32, thus transmitting torque from the inner race 18 to the outer race 14. In FIG. 3(b), the force CF represents the centrifugal force acting on the claw piece 32.

Meanwhile, torque transmission from the crankshaft 2 to the ring gear 16 is blocked by a ratchet mechanism, which is configured by the engagement portions 18a and the claw pieces 32.

In the engine 1 of the present embodiment, the pinion gear 44, which is connected to the output shaft 42 of the starting motor 40, meshes constantly with the gear portion 16a of the ring gear 16. This completes engine starting quickly compared to a configuration in which a pinion gear is moved to be engaged with a ring gear at the time of engine starting.

As has been described, mounting of the one-way clutch 30 in the engine 1 may have the disadvantage described below. Specifically, the one-way clutch 30 must be installed in the crankshaft 2 or the retainer 10 with the ring gear 16, the outer race member 12, the claw pieces 32, and the springs 33 mounted integrally in the one-way clutch 30. The claw pieces 32 are simply held between the inner circumferential surface of the outer race 14 and the opposing outer circumferential surface of the inner race 18. Accordingly, if the ring gear 16 and the outer race member 12 become spaced from each other when the one-way clutch 30 is mounted with respect to the engine body and the crankshaft 2, the claw pieces 32 falls off the one-way clutch 30. This makes mounting of the one-way clutch 30 difficult, thus making it necessary to carefully carry out the step of mounting the one-way clutch 30.

To solve this problem, as illustrated in FIG. 2, the ring gear 16 and the outer race member 12 of the present embodiment have threaded holes 19 and through holes 15, respectively. A jig 50 for fixing the ring gear 16 and the outer race member 12 to each other is mounted in each of the threaded holes 19 and the corresponding one of the through holes 15.

Specifically, each through hole 15 is a hole axially extending through the outer race member 12 and located inward of the groove 14d. Each threaded hole 19 is a hole having an axially faced opening in the rear end surface of the inner race 18 and functions as an internal thread. In the present embodiment, the flywheel 20 has a hole that axially extends through the flywheel 20.

The threaded holes 19 are arranged in a circumferential direction of the ring gear 16 and spaced apart at equal angular intervals. The through holes 15 are arranged in a circumferential direction of the outer race member 12 and spaced apart at equal angular intervals. The number of the through holes 15 is equal to the number of the through holes 19. The through holes 21 are arranged in a circumferential direction of the flywheel 20 and spaced apart at equal angular intervals. The number of the through holes 21 is equal to the number of the threaded holes 19. Alternatively, a single threaded hole 19, a single through hole 15, and a single through hole 21 may be arranged circumferentially.

The distance from the axis C of the crankshaft 2 to the axis P of each threaded hole 19, the distance from the axis C to the axis P of each through hole 15, and the distance from the axis C to the axis P of each through hole 21 are all equal. The inner diameter of the through hole 15 is greater than the inner diameter of the threaded hole 19 and the inner diameter of the through hole 21 is greater than the inner diameter of the through hole 15. Each through hole 15 and the corresponding through hole 21 are arranged at such positions that the through holes 15 and 21 correspond to each other in a state in which the position of each bolt hole 12a of the outer race member 12 and the position of the corresponding bolt hole 20a of the flywheel 20 correspond to each other in a circumferential direction of the outer race member 12 (the flywheel 20).

A procedure for mounting the one-way clutch 30 and the flywheel 20 with respect to the engine body and the crankshaft 2 will hereafter be described with reference to FIGS. 4 and 5.

Figure 4A:
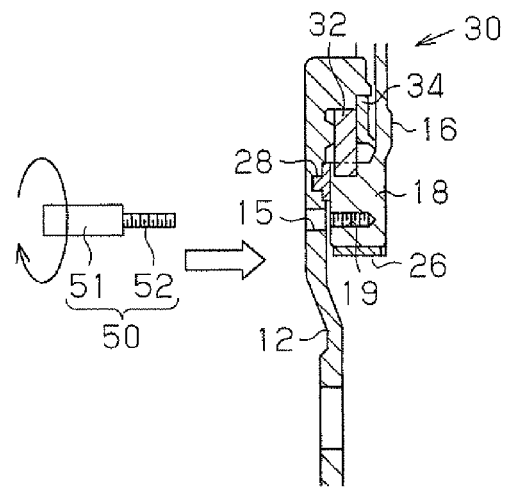
FIG. 4(a) is a cross-sectional view illustrating an assembling step for the engine of the embodiment in which a ring gear and an outer race member are fixed to each other.

As illustrated in FIG. 4(a), prior to installation of the one-way clutch 30 with respect to the engine body (in the present embodiment, the retainer 10) and the crankshaft 2, the claw pieces 32, the springs 33, and the second bushing 28 are mounted in the ring gear 16 and the outer race member 12. The jigs 50 are then passed through the through holes 15 and the corresponding threaded holes 19 and rotated clockwise. This fixes the ring gear 16 and the outer race member 12 to each other. By this time, the first bushing 26 must be received by the inner circumferential surface of the inner race 18. Alternatively, unlike the present embodiment, the first bushing may be received by the small diameter portion 10c of the retainer 10 and the outer circumferential surface of the first bushing and the opposing inner circumferential surface of the inner race 18 may be slidable surfaces.

Each of the jigs 50 includes a substantially columnar basal portion 51 and a distal portion 52 extending from the basal portion 51. The distal portion 52 functions as an external threaded portion and is threaded onto the corresponding threaded hole 19. The diameter of the basal portion 51 exceeds the diameter of the distal portion 52. The diameter of the basal portion 51 is greater than the diameter of each through hole 15 and smaller than the diameter of each through hole 21.

Figure 4B:
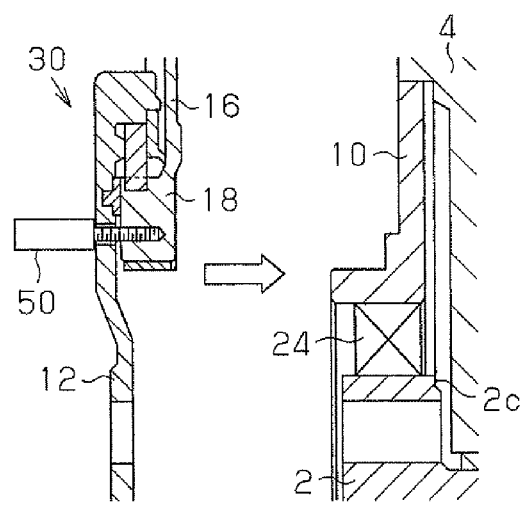
FIG. 4(b) is a cross-sectional view illustrating an assembling step for the engine of the embodiment in which a one-way clutch is mounted.

Then, as illustrated in FIG. 4(b), the one-way clutch 30 is held in a fixed state by the jigs 50 and mounted with respect to the engine body, in which the retainer 10 is assembled with the cylinder block 4 and the oil seal 24 is mounted between the inner circumferential surface of the retainer 10 and the large diameter portion 2c of the crankshaft 2, and the crankshaft 2 from the rear side (a first step).

Figure 4C:
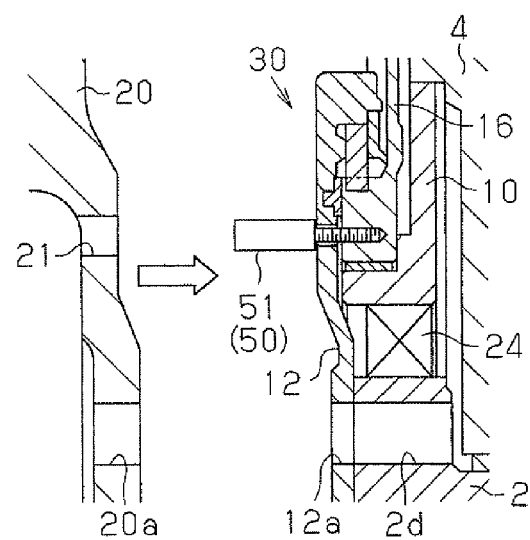
FIG. 4(c) is a cross-sectional view illustrating an assembling step for the engine of the embodiment in which a flywheel is mounted.

Subsequently, with reference to FIG. 4(c), the flywheel 20 is mounted on the crankshaft 2, on which the one-way clutch 30 has been mounted, from the rear side (a third step). Specifically, the flywheel 20 is installed by passing the basal portion 51 of each jig 50 through the corresponding through hole 21 of the flywheel 20.

By means of the jigs 50, the through holes 21 of the flywheel 20 are guided to the positions coaxial with the positions of the corresponding through holes 15 of the outer race member 12 and the associated threaded holes 19. As a result, the through holes 20a of the flywheel 20, which are circumferentially located, are arranged coaxially with the corresponding through holes 12a and the associated bolt holes 2d of the crankshaft 2. This facilitates positioning of the through holes 12a, 20a with respect to the bolt holes 2d of the crankshaft 2. In other words, the flywheel 20 is positioned by inserting the basal portions 51 into the corresponding through holes 21.

Figure 5A:
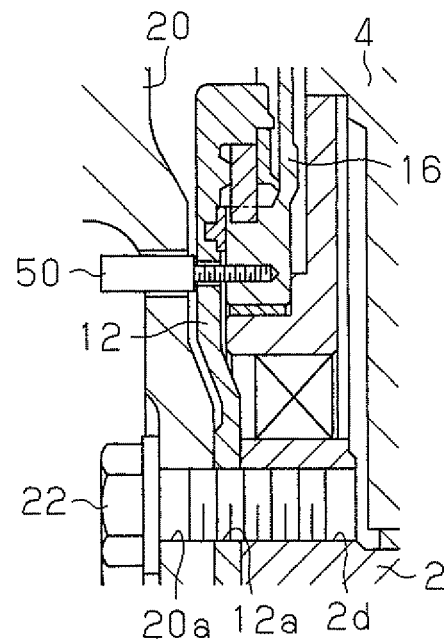
FIG. 5(a) is a cross-sectional view illustrating an assembling step for the engine of the embodiment after the flywheel is mounted.

Next, as illustrated in FIG. 5(a), the bolts 22 are passed through the through holes 20a, the through holes 12a, and the bolt holes 2d to fix the outer race member 12 and the flywheel 20 to the crankshaft 2.

Figure 5B:
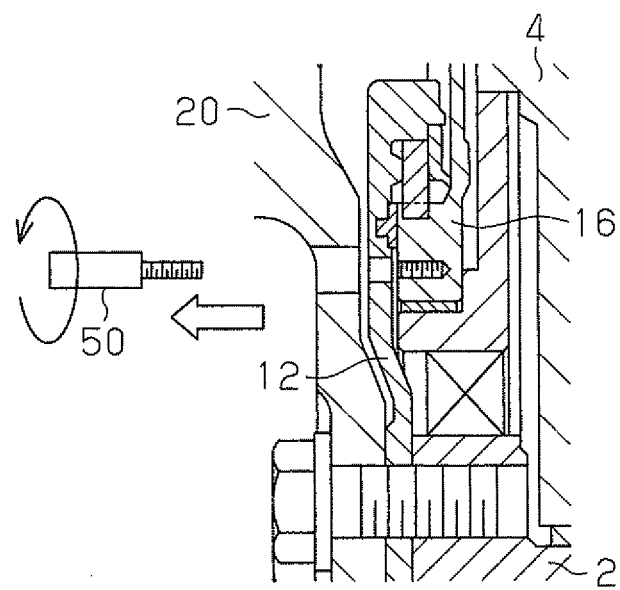
FIG. 5(b) is a cross-sectional view illustrating an assembling step for the engine of the embodiment after a jig is removed.

Finally, with reference to FIG. 5(b), the jigs 50 are rotated counterclockwise and thus removed from the ring gear 16 and the outer race member 12 (a second step).

The ring gear 16 corresponds to the inner race member according to the present invention. Each jig 50 corresponds to the fixing member according to the invention. Each threaded hole 19 and each through hole 15 both correspond to the attachment portion according to the invention. Each claw piece 32 corresponds to the engagement member according to the invention.

The internal combustion engine and the method for assembling the internal combustion engine of the present embodiment, which have been described, have the advantages described below.

(1) The ring gear 16 and the outer race member 12 have the threaded holes 19 and the through holes 15, respectively, to receive the jigs 50 for fixing the ring gear 16 and the outer race member 12 to each other. In this configuration, the ring gear 16, the outer race member 12, and the claw pieces 32 are mounted integrally in the one-way clutch 30. In this state, the jigs 50 are passed through and received in the threaded holes 19 and the through holes 15, which are formed in the ring gear 16 and the outer race member 12, respectively, to fix the ring gear 16 and the outer race member 12 to each other. This prevents the ring gear 16 from separating from the outer race member 12 when the one-way clutch 30 is mounted with respect to the engine body (the retainer 10) and the crankshaft 2. As a result, separation of the claw pieces 32 from the ring gear 16 and the outer race member 12 is avoided and the one-way clutch 30 is easily mounted with respect to the engine body and the crankshaft 2.

(2) The ring gear 16 is arranged between the outer race member 12 and the cylinder block 4 in the axial direction of the crankshaft 2. The through holes 15 extend along the axis C of the crankshaft 2 in the outer race member 12. The threaded holes 19 extend along the axis C of the crankshaft 2 in the ring gear 16. The through holes 15 and the threaded holes 19 are radially spaced from the axis C by equal distances. As a result, after the ring gear 16 and the outer race member 12 are fixed to each other using the jigs 50, each of which has a threaded shape, and mounted with respect to the engine body (the retainer 10) and the crankshaft 2, the jigs 50 are easily detached from the side corresponding to the through holes 15 formed in the outer race member 12. This further facilitates installation of the one-way clutch 30 with respect to the engine body and the crankshaft 2.

(3) The flywheel 20 is connected to the crankshaft 2 on the opposite side to the ring gear 16 with respect to the outer race member 12. The flywheel 20 has the through holes 21, which extend along the axis C of the crankshaft 2 and are radially spaced from the axis C each by the distance equal to the distance by which each through hole 15 and each threaded hole 19 are radially spaced from the axis C. As a result, when the flywheel 20 is assembled with the crankshaft 2 after the one-way clutch 30 is mounted with respect to the engine body (the retainer 10) and the crankshaft 2, the basal portions 51 of the jigs 50 attached to the one-way clutch 30 are passed through the through holes 21 of the flywheel 20 to position the flywheel 20. Also, the jigs 50 are easily detached after the flywheel 20 has been mounted on the crankshaft 2.

(4) The method includes the first step and a second step, which is performed after the first step. In the first step, the ring gear 16 and the outer race member 12, which have been fixed to each other through the jigs 50 with the claw pieces 32 installed, are mounted on the crankshaft 2. In the second step, the jigs 50 are removed from the ring gear 16 and the outer race member 12. According to the method, the first step accomplishes mounting of the ring gear 16 and the outer race member 12 on the crankshaft 2, with the jigs 50 fixing the ring gear 16 and the outer race member 12 to each other and the claw pieces 32 mounted between the ring gear 16 and the outer race member 12. Subsequently, the second step removes the jigs 50 from the ring gear 16 and the outer race member 12. In this manner, the same advantage as the above-described advantage (1) is achieved.

(5) The flywheel 20 is connected to the crankshaft 2 on the opposite side to the inner race member 16 with respect to the outer race member 12. The flywheel 20 has the through holes 21, which extend along the axis C of the crankshaft 2 and are radially spaced from the axis C by a distance equal to the distance by which each through hole 15 and each threaded hole 19 are radially spaced from the axis C. Further, the third step is performed after the first step and before the second step. In the third step, the flywheel 20 is mounted onto the crankshaft 2 from the opposite side to the ring gear 16 with respect to the outer race member 12, to pass the basal portions 51 of the jigs 50 through the through holes 21 of the flywheel 20. As a result, the method ensures the same advantage as the above-described advantage (3).

The internal combustion engine and the method for assembling the engine according to the present invention are not restricted to the configuration of the above described embodiment but may be embodied in, for example, the forms described below, which modify as necessary the previously described embodiment.

In the configuration of the above described embodiments, the retainer 10 is engaged with the fitting portion 4a of the cylinder block 4 and the fitting portion 8a of the oil pan 8 to maintain the oil seal 24. This configuration allows the invention to use the cylinder block 4 and the oil pan 8, which may be employed in a typical conventional internal combustion engine that does not include a one-way clutch 30. The configuration of the cylinder block, in which the one-way clutch 30 is mounted, and the configuration of the oil pan are not restricted to those described in the above embodiment. Alternatively, for example, an oil seal may be held directly by a fitting portion in the cylinder block and a fitting portion in the oil pan. In this case, the retainer may be omitted.

It is desirable to form the through holes 21 in the flywheel 20, as in the above described embodiments, to position the flywheel 20. However, if a flywheel is positioned by other means, the flywheel does not need to have a through hole.

In the above described embodiments, the ring gear 16 has the threaded holes 19, which are not through holes. However, the threaded holes 19 may be through holes extending through the ring gear 16.

In the above described embodiments, the ring gear 16 and the outer race member 12 are fixed to each other by means of the jigs 50 passed through the threaded holes 19 and the through holes 15. However, the attachment portions to which the fixing member is attached are not restricted to the configuration of the embodiment. That is, any suitable attachment portions may be employed as long as the attachment portions are provided in both the ring gear and the outer race member and the fixing member, which fixes the ring gear and the outer race member to each other, is attached to the attachment portions.

The above described embodiments represent the internal combustion engine 1 having the ratchet type one-way clutch 30 and the method for assembling the engine 1. However, a one-way clutch according to the present invention is not restricted to this. Specifically, the invention may be used in an internal combustion engine having a sprag type one-way clutch and a method for assembling the engine.

DESCRIPTION OF THE REFERENCE NUMERALS

1 . . . internal combustion engine, 2 . . . crankshaft, 2a . . . rear end portion, 2b . . . journal, 2c . . . large diameter portion, 2d . . . bolt hole, 4 . . . cylinder block, 4a . . . fitting portion, 6 . . . crank bearing cap, 7 . . . crank bearing, 8 . . . oil pan, 8a . . . fitting portion, 10 . . . retainer, 10a . . . large diameter portion, 10b . . . middle diameter portion, 10c . . . small diameter portion, 12 . . . outer race member, 12a . . . through hole, 14 . . . outer race, 14a . . . recess, 14b . . . spring accommodating portion, 14c . . . projection, 14d . . . groove, 15 . . . through hole, 16 . . . ring gear, 16a . . . gear portion, 18 . . . inner race, 18a . . . engagement portion, 19 . . . threaded hole, 20 . . . flywheel, 20a . . . through hole, 21 . . . through hole, 22 . . . bolt, 24 . . . oil seal, 26 . . . first bushing, 28 . . . second bushing, 30 . . . one-way clutch, 32 . . . claw piece, 33 . . . spring, 34 . . . grease seal, 40 . . . starting motor, 42 . . . output shaft, 44 . . . pinion gear, 50 . . . jig, 51 . . . basal portion, 52 . . . distal portion, C . . . axis.

The invention claimed is:

1. An internal combustion engine comprising: a one-way clutch including an inner race member connected to an output shaft of a motor for starting the engine, an outer race member connected to an engine output shaft, and an engagement member arranged between an outer circumferential surface of the inner race member and an inner circumferential surface of the outer race member facing the outer circumferential surface of the inner race member,
wherein the inner race member and the outer race member both include an attachment portion for attaching a fixing member for fixing the inner race member and the outer race member to each other.

2. The internal combustion engine according to claim 1, wherein
the one-way clutch is a ratchet type one-way clutch,
the engagement member is a claw piece, and
an engagement portion with which the claw piece is engageable is formed in the outer circumferential surface of the inner race member.

3. The internal combustion engine according to claim 1, wherein the attachment portions are holes formed in the respective ones of the inner race member and the outer race member, the fixing member being passed through the holes.

4. The internal combustion engine according to claim 3, wherein
the inner race member is arranged between the outer race member and a cylinder block in the axial direction of the engine output shaft,
the outer race member has a through hole extending along the axis of the engine output shaft,
the inner race member has a threaded hole extending along the axis of the engine output shaft, and
the through hole and the threaded hole are radially spaced from the axis of the engine output shaft by equal distances.

5. The internal combustion engine according to claim 4, wherein
   a flywheel is connected to the engine output shaft on a side opposite to the inner race member with respect to the outer race member, and
   the flywheel has a through hole that extends along the axis of the engine output shaft and is radially spaced from the axis by a distance equal to the distance by which the through hole and the threaded hole are radially spaced from the axis.

6. A method for assembling an internal combustion engine having a one-way clutch including an inner race member connected to an output shaft of a motor for starting the engine, an outer race member connected to an engine output shaft, and an engagement member arranged between an outer circumferential surface of the inner race member and an inner circumferential surface of the outer race member facing the outer circumferential surface of the inner race member, the method comprising:
   a first step for mounting the inner race member and the outer race member on the engine output shaft in a state in which the inner and outer race members are fixed to each other by means of a fixing member with the engagement member installed; and
   a second step for separating the fixing member from the inner race member and the outer race member after the first step.

7. The method according to claim 6, wherein
   the one-way clutch is a ratchet type one-way clutch,
   the engagement member is a claw piece, and
   an engagement portion with which the claw piece is engageable is formed in the outer circumferential surface of the inner race member.

8. The method according to claim 6, wherein
   the inner race member and the outer race member are mounted on the engine output shaft such that the inner race member is arranged between the outer race member and a cylinder block in the axial direction of the engine output shaft,
   the outer race member has a through hole extending along the axis of the engine output shaft,
   the inner race member has a threaded hole extending along the axis of the engine output shaft,
   the through hole and the threaded hole are radially spaced from the axis of the engine output shaft by equal distances, and
   the fixing member is a jig having an external threaded portion, wherein the inner race member and the outer race member are fixed to each other by passing the jig through the through hole and threading the threaded portion onto the threaded hole.

9. The method according to claim 8, wherein
a flywheel is connected to the engine output shaft on a side opposite to the inner race member with respect to the outer race member,
the flywheel has a through hole that extends along the axis of the engine output shaft and is radially spaced from the axis by a distance equal to the distance by which the through hole and the threaded hole are radially spaced from the axis, and
the method further comprises a third step for mounting the flywheel on the engine output shaft from the side opposite to the inner race member with respect to the outer race member to pass a basal portion of the jig through the through hole of the flywheel, the third step being performed after the first step and before the second step.

* * * * *